Patented Apr. 27, 1954

2,676,928

UNITED STATES PATENT OFFICE 2,676,928

PRODUCTION OF CELLULAR PRODUCTS

Robert L. Frank, Lake Geneva, Wis., assignor to Ringwood Chemical Corporation, Ringwood, Ill., a corporation of Illinois No Drawing. Application January 19, 1951, Serial No. 206,919

11 Claims. (Cl. 260—2.5)

My invention relates to the production of cellular products from natural and synthetic thermoplastic materials. More particularly, my invention relates to the expanding or blowing of natural or synthetic thermoplastic materials and to improved expanding or blowing agents therefor.

Methods for the production of cellular products from natural and synthetic thermoplastic materials, the properties of the resulting products and the many uses of these materials are all well known to those skilled in the art.

Broadly speaking, four principal methods are employed in the formation of cellular products from natural and synthetic thermoplastic materials. In one method gas bubbles are distributed throughout a latex of a natural or synthetic thermoplastic material or a precursor thereof; the resulting latex foam is then coagulated to produce a stable, solid foam which may be either elastic or rigid. The gas may be introduced into the latex by any one of several methods or any combination of these methods. For example, the latex may be whipped, whereby small bubbles of air are introduced into and uniformly distributed throughout the latex. Or, the latex may be saturated with a gas under elevated pressure. On releasing the pressure, gas in excess of the solubility limit thereof is eliminated in the form of small bubbles uniformly distributed throughout the resulting foam. In another method, a suitable material or a mixture of suitable materials is incorporated in the latex. Reaction occurs, either between the material introduced and the latex serum or between the components of the mixture of materials introduced (usually after solution in the serum) with the production of gas. The present invention is not concerned with the production of cellular products by foaming and coagulating a latex of natural or synthetic thermoplastic materials, or precursors thereof.

A second method of quite limited application for the formation of cellular products from natural or synthetic thermoplastic materials depends upon the autogeneous generation of the blowing gas by the material itself or a precursor thereof. Thus, an alkyd with free end groups (hydroxyl and carboxyl) is mixed with an isocyanate. On heating the mixture, reaction occurs with the elimination of carbon dioxide which expands the reaction product. Another method, also of comparatively minor importance, involves the saturation of natural or synthetic thermoplastic materials with gas at high pressure. On releasing the pressure, excess gas over the solubility limit thereof is evolved and blows the material. My invention is not concerned with either of these methods.

My invention relates to a fourth principal method employed in the formation of cellular products from natural and synthetic thermoplastic materials. In this method, the material (or a precursor thereof), which may also contain necessary or desirable amounts of plasticizers, pigments, vulcanizing agents, accelerators, stabilizers and the like, is admixed with the proper amount of a blowing agent and the resulting mixture is heated. The blowing agent decomposes on heating with the evolution of gas resulting in the production of a cellular product. Many variations of this general method are employed in the art; some of the more important of these variations will be described subsequently herein.

Cellular products, produced as above described or otherwise, may be obtained in a wide variety of physical forms. For example, some of these materials are dimensionally stable solidified foams exhibiting more or less mechanical strength. Such rigid materials may be obtained by starting with rubber formations suitable for the production of ebonite, from polystyrene, urea-formaldehyde resins, polyvinyl chloride and the like. Other cellular products are not dimensionally stable when subjected to stress or strain but may be compressed, stretched, etcetera, with more or less ease, returning to their original shape and size after removal of the stress or strain. Among such elastic materials may be mentioned the cellular products produced from a wide variety of natural and synthetic rubber formulations, from polyvinyl chloride, and the like.

Cellular products, prepared as above described or otherwise, have a wide variety of uses. Dimensionally stable materials may be used for thermal insulation, as an extremely light weight construction material in applications where no great mechanical strength is required, as packing materials, in the construction of life belts, life rafts, pontoons and similar appliances, etcetera. Resilient cellular products which are deformed with more or less ease by the application of stress or strain are also of wide utility. Such materials may be employed, for example, as upholstery, in the manufacture of pillows, mattresses and the like, in the construction of life belts, life rafts and the like, as weather stripping, as seals for closures, in safety devices (e. g. lining of crash helmets), et cetera.

One object of my invention is to provide an improved method for the production of cellular products.

Another object of my invention is to provide an improved method for the production of cellular products from thermoplastic materials.

An additional object of my invention is to provide an improved method for the production of cellular products from natural thermoplastic materials.

A further object of my invention is to provide an improved method for the production of cellular products from synthetic thermoplastic materials.

Yet another object of my invention is to provide improved blowing agents effective for the production of cellular products from natural and synthetic thermoplastic materials.

Additional objects of my invention will become apparent as the description thereof proceeds.

An ideal blowing agent for the preparation of cellular products from natural or synthetic thermoplastic materials must exhibit a combination of desirable properties, some of the more important of these being considered briefly below.

Foremost among these desirable properties is an inherent ability to decompose smoothly but fairly rapidly with the evolution of gas at a temperature within the range conventionally employed in the processing of the natural or synthetic thermoplastic material concerned. (Most rubber processing operations, for example, are conducted at temperatures of 325° F. or below.) In some applications, the rate of decomposition is a matter of considerable importance. For example, in the production of sponge rubber (natural or synthetic), wherein decomposition of the blowing agent and vulcanizing of the rubber occur simultaneously, if the rate of gas evolution is too slow, the stock will be completely vulcanized before decomposition of the blowing agent is complete and as a result, the last portions of the gas evolved do not have sufficient power to blow the completely vulcanized stock. On the other hand, if the blowing agent decomposes too rapidly, all gas is evolved before the stock has developed sufficient strength to entrap the gas and as a result a considerable portion escapes from the stock. Obviously, either too rapid or too slow decomposition of the blowing agent results in an incomplete blow.

Also, the blowing agent should have a sufficient blowing power to expand formulations having compositions that result in finished products exhibiting satisfactory tensile strength and tear resistance. Thus many synthetic rubbers are (in comparison with natural rubber) stiff and weak. A weak blowing agent is incapable of sponging such material. If the synthetic is softened to a sufficient degree with plasticizers and/or oils to enable a weak blowing agent to form a cellular product therefrom, the resulting sponge does not show sufficient tear resistance and tensile strength for commercial use. If an attempt is made to improve the properties of the sponge by incorporating reenforcing pigments in the formulation, then the formulation becomes stiff again and a weak blowing agent is incapable of forming a satisfactory sponge therefrom.

The blowing agent decomposition reaction should not be too strongly exothermic. Cellular products are obviously excellent thermal insulators and if a large amount of heat is evolved during the decomposition of the blowing agent, much of this cannot escape and may result in charring of the sponge.

Decomposition of the blowing agent should result in the formation of a gas that does not permeate in and through the cell walls. As is well known, rubber and polyvinyl chloride are very permeable towards carbon dioxide but are much less permeable to nitrogen.

The weight of blowing agent required to produce unit volume of gas should be as low as possible, otherwise an inordinate amount of blowing agent may be required to produce a given volume of sponge.

The blowing agent and, even more particularly, its decomposition products should be non-toxic and not otherwise obnoxious.

The blowing agent and its decomposition products should be colorless and odorless.

The solid decomposition products of the blowing agent should not bloom to the surface of the sponge or, if they do, should not stain or otherwise injure surfaces that must be in contact with the sponge.

The blowing agent should be as inexpensive as possible on the basis of total cost per unit volume of sponge produced.

A large number of blowing agents have been described and employed in the prior art. A few of the more important of these, including their respective advantages and disadvantages, are listed below.

(1) *Sodium bicarbonate*

Advantages:
  a. Satisfactory decomposition rate.
  b. Thermal effect of decomposition satisfactory.
  c. A small weight theoretically produces a large volume of gas.
  d. Non-toxic.
  e. Colorless and odorless; non-staining.
  f. Inexpensive. However, in spite of any theoretical considerations, a large amount must be employed (in comparison with most blowing agents) to obtain a satisfactory blow. Also, this agent must be used together with a relatively large amount of stearic acid which is comparatively expensive.

Disadvantages:
  a. Weak blowing agent. While natural rubber may be sufficiently plasticized so that the limited blowing power of sodium bicarbonate is effective and results in a sponge of adequate strength and tear resistance, this is not true with most synthetic rubbers.
  b. Carbon dioxide produced.

(2) *Diazoaminobenzene*

Advantages:
  a. Satisfactory rate of decomposition.
  b. Strong blowing agent.
  c. Thermal effect of decomposition satisfactory.
  d. Blow due to nitrogen.
  e. Small weight produces a large volume gas.

Disadvantages:
  a. Rather obnoxious and is toxic to some individuals.
  b. In unpigmented formulations produces a bright orange sponge.
  c. Decomposition products bloom to surface and stain fabrics.
  d. Rather expensive.

(3) *Porophor N.* (*Azo diisobutyronitrile*)

Advantages:
   a. Satisfactory decomposition rate.
   b. Strong blowing agent.
   c. Thermal effect of decomposition satisfactory.
   d. Produces nitrogen.
   e. Small weight produces a large volume gas.
   f. Colorless, but sponge slowly darkens with aging.
   g. Non-blooming and non-staining.

Disadvantages:
   a. Toxic. Also, reports of difficulties due to uncontrollable and rapid decomposition during manufacture.
   b. Expensive.

As might be inferred from the above brief consideration of a number of commonly used blowing agents, no blowing agent is perfect in all respects for all applications and it is doubtful if such an ideal blowing agent will ever be developed. However, I have discovered a class of blowing agents, the members of which exhibit most of the previously described desirable characteristics of these materials and which do not possess any serious disadvantages.

The improved blowing agents of my invention comprise N-nitroso beta amino ketones and accordingly have the characteristic group:

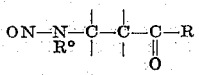

where R and R° are organic radicals.

The improved blowing agents of my invention may be synthesized by well known and conventional procedures and since these procedures form no part of my invention they will not be described in great detail.

Broadly and briefly, N-nitroso beta amino ketones may be prepared by first reacting an alpha olefine-ketone, possessing the characteristic grouping:

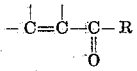

with a primary amine to produce a beta amino ketone (which will be a secondary amine):

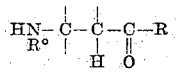

where R and R°, as before, are organic radicals.

The resulting intermediate is converted to a salt (e. g. the hydrochloride or sulfate) and this salt in turn is transformed into the N-nitroso compound by conventional methods, for example, by treatment with sodium nitrite:

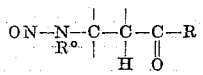

The above synthetic method can perhaps be best understood by considering briefly a few specific examples thereof.

Mesityl oxide, 2 - methyl 2 - penten - 4-one, formed by the condensation of two molecules of acetone, is allowed to react with isopropyl amine to form N-isopropyl diacetone amine (R=methyl, R°=isopropyl). On treating a salt of this secondary amine with sodium nitrite, the desired N-isopropyl N-nitroso diacetone amine (hereinafter referred to as INDA) is formed. Obviously, by employing other primary amines in place of isopropyl amine, a host of homologues and analogues of the above parent compound may be made. For example, using methyl amine, N-methyl N-nitroso diacetone amine (MNDA) is formed. These materials have the general formula:

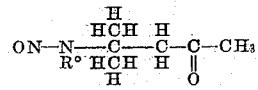

where R° is an organic radical.

Diacetone amine, produced by the interaction of mesityl oxide and ammonia, is a methyl ketone, and would be expected to condense with aldehydes or ketones to produce an alpha olefin-ketone grouping. Thus, with acetone, it might be expected that

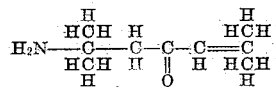

would be obtained. However, it will be noted that this compound, in addition to containing the alpha olefine-ketone grouping, also is a primary amine, conditions necessary and sufficient to form the intermediate secondary beta amino ketones of my invention. Accordingly, instead of the above compound, a substituted 4-piperidone, 2,2,6,6, tetramethyl 4-piperidone (triacetone amine) is formed:

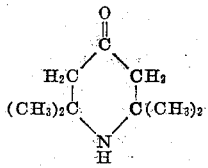

the salt of which, when reacted with sodium nitrite, gives N-nitroso 2,2,6,6-tetramethyl 4-piperidone (N-nitroso triacetone amine, NTA) which is obviously a N-nitroso beta amino ketone.

While more convenient methods for the synthesis of NTA are available and will be described subsequently, the above general method is of wide applicability in the synthesis of the blowing agents of my invention. Thus, the intermediate produced by condensing diacetone amine with an aldehyde, RCHO, may be converted into a N-nitroso 2-R 6,6-dimethyl 4-piperidone. Similarly, when a ketone, RR°C=O, is employed, N-nitroso 2,2-RR° 6,6-dimethyl 4-piperidones are formed. Thus with aldehydes, R may be H (formaldehyde), methyl, isopropyl, 2-furyl, et cetera, and the same wide choice is available in the identity of R and R° if a ketone is used.

NTA is more conveniently prepared by interacting phorone (2,6-dimethyl 2,5-heptadien-4-one), made by the condensation of three molecules of acetone, with ammonia to give triacetone amine (2,2,6,6-tetramethyl 4-piperidone). The salt of this compound reacts with sodium nitrite to give NTA.

While the above paragraphs have described the reaction of the dimolecular acetone condensation product with a primary amine to give an N-derivative of diacetone amine or reaction of the trimolecular acetone condensation product with ammonia to give triacetone amine, it should be noted that acetone itself condenses and then reacts with e. g. ammonia (or reacts with e. g. ammonia, the resulting compound then condensing) to form diacetone amine and triacetone amine. However, a cleaner reaction is obtained as previously described by starting with the acetone condensation products themselves. On reacting acetone with ammonia, a mixture of diacetone amine and triacetone amine forms. The first named compound cannot be used directly in the synthesis of N-nitroso compounds of my invention for it reacts with nitrite to form diacetone alcohol. However, it may be condensed with a molecule of aldehyde or ketone and then used as previously described. When acetone is condensed with a primary amine a mixture of N-substituted diacetone amine and N-substituted triacetone amine forms. The first named is eminently suitable for use in the formation of the N-nitroso compounds of my invention while the second, being a tertiary amine, cannot be so employed.

Isophorone, the cyclic isomer of phorone, may be subjected to a similar series of reactions to produce 3-N-nitrosoamino 3,5,5-trimethyl cyclohexanone with an organic radical R on the amino nitrogen atom.

While the preparation of the blowing agents of my invention has been largely described in connection with homogeneous condensation products, heterogeneous condensation products may also be used. One example of this modification will be given. Instead of starting with phorone, made by the condensation of three molecules of acetone, one molecule of acetone may be condensed with two molecules of furfuraldehyde (for example) to give 1,5-di-(2-furyl) 1,4-pentadien-3-one which, when reacted with ammonia, converted to a salt and treated with sodium nitrite, forms N-nitroso 2,6-di(2-furyl) 4-piperidone. Also, condensation products of even greater heterogeneity may be employed. Thus, one molecule of acetone may be condensed with one molecule of acetaldehyde to produce 2-penten-4-one and this product may in turn be condensed with one molecule of furfuraldehyde to give 1-(2-furyl) 1,4-hexadien-3-one which, when treated with ammonia, converted into a salt and then reacted with sodium nitrite gives N-nitroso 2-(2-furyl) 6-methyl 4-piperidone.

In the preparation of the N-nitroso beta amino ketones of my invention it will be noted that if but one alpha olefine-ketone grouping is available, such an olefinic ketone must be reacted with a primary amine to give an intermediate secondary amine from which the desired N-nitroso derivative may be prepared. However, if two alpha olefine ketone groups are available or a 1,4-dien-3-one grouping

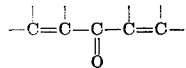

then the di-(olefine-ketone) or the diolefine ketone must be interacted with ammonia in order to produce a secondary amine capable of being converted to the N-nitroso derivative.

While the preparation of the intermediate alpha olefine-ketones has been exclusively described in connection with the condensation of aldehydes and/or ketones, these compounds may be prepared by a large number of reactions. For example, alpha olefine-ketones are produced by the dehydrohalogenation of beta halogen ketones. Also, olefines and acid chlorides react, under the catalytic influence of aluminum chloride, to produce alpha olefine-ketones. Many other less convenient synthetic methods for the preparation of these compounds are known and are described in standard advanced texts.

The N-nitroso beta amino ketones of my invention, when heated in the presence of a basic catalyst such as an amine, a substituted amine, ammonium hydroxide and the like, decompose with the production of nitrogen:

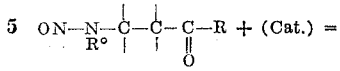
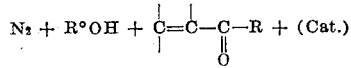

It will be noted that in this decomposition reaction, the original alpha olefine-ketone is regenerated and the $R°$ of the primary amine employed in the original synthesis appears in the form of the hydroxyl derivative. The 4-piperidone derivatives react in a similar manner; here probably an unstable hydroxyl derivative is first formed which loses water to form the original alpha diolefine-ketone:

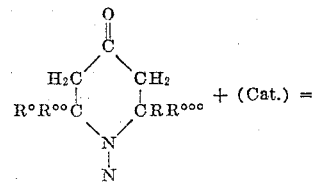
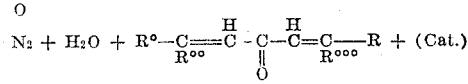

Having now described the synthesis and decomposition of the improved blowing agents of my invention, attention will now be directed to their employment in the blowing of natural and synthetic thermoplastic materials.

*Example 1*

Conventionally formulated natural rubber was easily blown (in the apparatus described in Example 2, below), employing the base catalyzed blowing agents of my invention, to produce cellular products of excellent characteristics and having a density in the range 0.10 to 0.15 ounce per cubic inch or 10.8 to 16.2 pounds per cubic foot. For reasons previously given, the blowing of natural rubber is not a critical demonstration of the excellence of the blowing agents of my invention since rather imperfect agents give satisfactory expanded products with this material. However, it is to be noted that the hydroxyl ion catalyzed blowing agents of my invention were sufficiently powerful to blow a high sulfur (35%) natural rubber formulation into a rigid, dimensionally stable expanded ebonite.

*Example 2*

The following formulation was prepared by standard procedures (parts are by weight):

| | Parts |
|---|---|
| GR–S synthetic rubber | 100 |
| MT thermal black | 20 |
| Altax | 1 |
| Thionex | 0.3 |
| Zinc oxide | 5 |
| Stearic acid | 10 |
| Softening oil | 40 |
| Sulfur | 2.5 |
| NTA | 4 |
| Triethanolamine (catalyst) | 1 |

One and thirty-six hundredths of an ounce of the above formulation was placed in an experimental mold of intricate design and having a capacity of eight cubic inches. The mold was closed and heated to 298° F. and was maintained at this temperature for 15 minutes. A cellular product conforming to all the intricacies of the mold was produced which exhibited good tensile strength and tear resistance. The expanded product had a density of 0.17 ounce per cubic inch (18.4 pounds per cubic foot).

Example 3

The following formulation was prepared by standard procedures, parts being by weight:

|  | Parts |
|---|---|
| GR-S synthetic rubber | 100 |
| HMF furnace black | 10 |
| Altax | 1 |
| Thionex | 0.2 |
| Zinc oxide | 5 |
| Stearic acid | 5 |
| Circo oil (softener) | 40 |
| RPA No. 5 (peptizer) | 3 |
| Sulfur | 2.5 |
| NTA | 4 |
| Triethanolamine (catalyst) | 1 |

One and six tenths ounces of the above formulation were placed in the mold described in Example 2. The mold was closed and heated to 324° F. and maintained at this temperature for 15 minutes. A cellular product, conforming to all the intricacies of the mold was produced which exhibited good tensile strength and tear resistance. The expanded product had a density of 0.20 ounce per cubic inch (21.6 pounds per cubic foot).

Example 4

The following formulation was made, the parts being parts by weight:

|  | Parts |
|---|---|
| Polyvinyl chloride, powdered | 100 |
| Dibutyl phthalate | 20 |
| NTA | 42 |
| Triethanolamine (catalyst) | 10 |
| Water (small amount). |  |

The above components were mixed to give a homogeneous, fluffy, slightly moist powder. A mold made by drilling a one inch diameter hole through the center of a circular steel plate, three inches in diameter and 0.5 inch thick was used. The mold was placed on a cardboard gasket covered with aluminum foil and the mold space was filled seven eighths full (gentle tamping) with the above mix. The mold was then covered with a second cardboard gasket covered with aluminum foil and the whole assembly was placed between the platens of a hydraulic press and the pressure raised to 15,000 pounds per square inch. The temperature of the mold was raised to 320° F. and was held at this level for 40 minutes following which the temperature was brought down to about 85° F. The mold was opened and the plastic was removed from the mold space. It immediately expanded to six times the volume of the mold space. The partially blown material was then heated in an oven at 140° F. for 30 minutes. Further expansion occurred and the final product had a volume 14.5 times as great as the mold space. The density of the cellular product was a little over 0.03 ounce per cubic inch (3.3 pounds per cubic foot).

The expanded product was tough and resilient and was tan in color. It smelled of phorone which has a fresh and not unpleasant odor.

Example 5

The following mix was prepared, parts being parts by weight:

|  | Parts |
|---|---|
| Polyvinyl chloride powder | 100 |
| Dioctyl phthalate | 21.4 |
| Dioctyl adipate | 21.4 |
| Modified barium ricinoleate | 1.43 |
| Modified cadmium ricinoleate | 1.43 |
| NTA | 42.8 |
| Triethanolamine (catalyst) | 17.1 |

The mixture formed a fluid, creamy paste and the mold of Example 4 was filled seven eighths full therewith. The closing, heating, cooling and opening of the mold assembly followed exactly the regimen described in Example 4. However, the recovered plastic plug was not heated to final expansion in an oven but instead was held immersed for 20 minutes in water at 194° F.

The cellular product was tan in color and had a density of between 0.037 and 0.046 ounce per cubic inch (4-5 pounds per cubic foot) in various runs made with the above formulation.

Example 6

In Examples 4 and 5, NTA and triethanolamine were employed in weight ratios of 4.2:1 and 2.5:1 respectively. Various other ratios with this catalyst and various other catalysts were investigated in a large number of supplementary experiments. These experiments were conducted generally in accordance with the directions given in Examples 4 and 5. However, frequently the polyvinyl chloride:plasticizer ratio was different and the plasticizer used was different than shown in Examples 4 and 5. Also, frequently, the polyvinyl chloride:blowing agent ratio varied from the figures previously shown. In addition, the blowing temperatures and times departed from the values previously given in many of these supplementary experiments. To present each of these supplementary experiments in individual examples reciting in detail the departures from the previously described procedures would unduly lengthen this specification without a commensurate increase in clarity so the results of a number of these supplementary experiments are briefly presented below in tabular form.

| Catalyst | Wt. Ratio NTA:Catalyst | Temp., °F. | Time, Min. | Product Color | Product Expansion | Density Oz./In.³ | Density Lb./Ft.³ |
|---|---|---|---|---|---|---|---|
| TEA | 4:1 | 293 | 10 | Brown | 11X |  |  |
| TEA+H₂O | 4:1:1 | 293 | 10 | do | 13X |  |  |
| TEA+Tr. water | 3:1:Tr. | 320 | 30 | Tan | 13X | 0.046 | 5 |
| n-Dodecylamine | 3:1 | 302 | 5 | do | 13X |  |  |
| Do | 1.5:1 | 302 | 5 | do | 16X |  |  |
| NH₃ (few drops) |  | 320 | 5 |  | 2X |  |  |
| None |  | 320 | 5 |  | None |  |  |
| Do |  | 374 | 5 |  | Charred |  |  |

The above table shows that a variety of materials capable of furnishing catalytic amounts of hydroxyl ion are effective for catalyzing the decomposition of NTA. In the absence of such a catalyst no expansion occurs (next to last experiment) even if the blowing temperature is increased to above the limit of thermal stability of polyvinyl chloride (last experiment).

*Example 7*

INDA is also an effective blowing agent for production of cellular products from polyvinyl chloride. Two experiments employing this material are shown in the table below; the remarks given in the introduction of Example 6 also apply here.

| Catalyst | Wt. Ratio INDA: Catalyst | Temp., °F. | Time, Min. | Product | | | |
|---|---|---|---|---|---|---|---|
| | | | | Color | Expansion | Density | |
| | | | | | | Oz./In.$^3$ | Lb./Ft.$^3$ |
| TEA | 2.5:1 | 320 | 20 | Brown | 6X | | |
| TEA | 5:1 | 320 | 30 | Tan | | 0.046 | 5 |

*Example 8*

The results obtained in several experiments in which MNDA was employed to produce cellular products from polyvinyl chloride are tabulated below. This table should be read in connection with the introductory remarks given in Example 6.

| Catalyst | Wt. Ratio MNDA: Catalyst | Temp. °F. | Time Min. | Product | | | |
|---|---|---|---|---|---|---|---|
| | | | | Color | Expansion | Density | |
| | | | | | | Oz./In.$^3$ | Lb./Ft.$^3$ |
| TEA | 12.5:1 | 320 | 5 | | None | | |
| TEA | 4.2:1 | 320 | 5 | | Good | | |
| TEA | 4.2:1 | 320 | 40 | Light Yellow | | 0.052 | 5.6 |
| TEA | 2.1:1 | 320 | 5 | | Good | | |
| TEA | 2.1:1 | 320 | 10 | Light Yellow | do | 0.056 | 6 |
| Ethylene diamine 68% | 6.3:1 | 320 | 5 | Yellow | 12X | | |
| Do | 4.2:1 | 320 | 5 | Tan | | 0.046 | 5 |
| None | | 320 | 5 | | None | | |

It will be noted that no expansion occurs in the absence of a source of hydroxyl ions (last experiment) and also if the MNDA:cataylst ratio is too high (first experiment) no expansion occurs.

Since MNDA has an appreciably lower molecular weight than INDA it is, from this point of view, a more efficient blowing agent. However, the decomposition reaction of MNDA is considerably more exothermic than that of INDA. As a result, some care must be exercised in the use of MNDA. If large amounts of this blowing agent (in comparison to the thermoplastic material) are used the resulting cellular product may be charred, especially in the center of the expanded mass. Also, if MNDA is employed in rather large amounts in the production of cellular products of large cross sectional area, charring may occur at the center of the mass. These observations illustrate the extreme flexibility of the blowing agents of my invention. MNDA is an extremely efficient blowing agent with respect to volume of gas produced per unit weight but is not too reliable if used in very large amounts in the production of cellular products or if used in rather large amounts in the production of cellular products of large cross section. However, by merely ascending the homologous series, for example, to INDA, a blowing agent is obtained which, while somewhat less efficient than MNDA on the basis of gas produced per unit weight, may be reliably employed in large amounts in the fabrication of cellular products. In the production of cellular products by the free blowing of thermoplastic materials, for example, in the free blowing of natural rubber, reclaimed natural rubber, synthetic rubber, reclaimed synthetic rubber and mixtures of these materials as described in connection with Examples 2 and 3 hereof, only small amounts of blowing agents are required and MNDA can be employed here in the production of cellular products, even if these have large cross sectional areas.

In the tables to be found in Examples 6, 7 and 8, the abbreviation TEA refers to triethanolamine.

Be it remembered, that while my invention has been described by means of numerous examples thereof, these are illustrative and non-limiting and it is to be understood that my invention covers all changes and modifications of the examples thereof, herein chosen for purposes of disclosure, that do not constitute departures from the spirit and scope of my invention.

I claim:

1. In a process for the production of polyvinyl chloride in cellular form, the steps including admixing polyvinyl chloride with a N-alkyl N-nitroso diacetone amine, and a basic substance in an amount sufficient to accelerate the thermal decomposition of said N-alkyl N-nitroso diacetone amine, heating the resulting mixture to cause catalyzed decomposition of the said N-alkyl N-nitroso diacetone amine with the generation of nitrogen and allowing said nitrogen to expand the mixture and produce a cellular structure.

2. The process of claim 1, further characterized by the fact that the N-alkyl group is a N-methyl group.

3. The process of claim 1, further characterized by the fact that the N-alkyl group is a N-isopropyl group.

4. In a process for the production of polyvinyl chloride in cellular form, the steps including admixing polyvinyl chloride with N-nitroso triacetone amine, and a basic substance in an amount sufficient to accelerate the thermal decomposition of said N-nitroso triacetone amine, heating the resulting mixture to cause catalyzed decomposition of said N-nitroso triacetone amine with the generation of nitrogen and allowing said nitrogen to expand the mixture to produce a cellular structure.

5. In a process for the production of thermoplastic materials in cellular form, the steps including admixing polyvinyl chloride with a N-nitroso beta amino ketone selected from the group consisting of N-nitroso triacetone amine and N-alkyl N-nitroso diacetone amines, and a basic substance in an amount sufficient to accelerate the thermal decomposition of said N-nitroso beta amino ketone, heating the resulting mixture to cause decomposition of the N-nitroso beta amino ketone with the generation of nitrogen and allowing said nitrogen to expand the mixture to produce a cellular structure.

6. In a process of producing polyvinyl chloride in cellular form, the steps including admixing polyvinyl chloride, N-isopropyl N-nitroso diacetone amine, and triethanol amine in an amount sufficient to accelerate the thermal decomposition of said N-isopropyl N-nitroso diacetone amine, heating the resulting mixture to cause thermal decomposition of said N-isopropyl N-nitroso diacetone amine with generation of nitrogen and allowing said nitrogen to expand the mixture to produce a cellular structure.

7. In a process of producing polyvinyl chloride in cellular form, the steps including admixing polyvinyl chloride, N-isopropyl N-nitroso diacetone amine, and triethanolamine, the weight ratio of N-isopropyl N-nitroso diacetone amine to triethanolamine being in the approximate range 2.5:1 to 5:1, heating the resulting mixture to cause thermal decomposition of said N-isopropyl N-nitroso diacetone amine with generation of nitrogen and allowing said nitrogen to expand the mixture to produce a cellular structure.

8. In a process of producing polyvinyl chloride in cellular form, the steps including admixing polyvinyl chloride, N-methyl N-nitroso diacetone amine, and triethanolamine in an amount sufficient to accelerate the thermal decomposition of said N-methyl N-nitroso diacetone amine, heating the resulting mixture to cause thermal decomposition of said N-methyl N-nitroso diacetone amine with generation of nitrogen and allowing said nitrogen to expand the mixture and produce a cellular structure.

9. In a process of producing polyvinyl chloride in cellular form, the steps including admixing polyvinyl chloride, N-methyl N-nitroso diacetone amine, and triethanolamine, the weight ratio of N-methyl N-nitroso diacetone amine to triethanolamine being in the approximate range 2.1:1 to 4.2:1, heating the resulting mixture to cause thermal decomposition of said N-methyl N-nitroso diacetone amine with generation of nitrogen and allowing said nitrogen to expand the mixture to produce a cellular product.

10. In a process of producing polyvinyl chloride in cellular form, the steps including admixing polyvinyl chloride, N-nitroso triacetone amine, and triethanolamine in an amount sufficient to accelerate the thermal decomposition of said N-nitroso triacetone amine, heating the resulting mixture to cause thermal decomposition of said N-nitroso triacetone amine with generation of nitrogen and allowing said nitrogen to expand the mixture to produce a cellular product.

11. In a process of producing polyvinyl chloride in cellular form, the steps including admixing polyvinyl chloride, N-nitroso triacetone amine, and triethanolamine, the weight ratio of N-nitroso triacetone amine to triethanolamine being in the approximate range 1.5:1 to 4.2:1, heating the resulting mixture to cause thermal decomposition of said N-nitroso triacetone amine with generation of nitrogen and allowing said nitrogen to expand the mixture to produce a cellular product.

References Cited in the file of this patent

UNITED STATES PATENTS

| Number | Name | Date |
|---|---|---|
| 2,299,593 | Roberts | Oct. 20, 1942 |
| 2,491,709 | Briggs et al. | Dec. 20, 1949 |

OTHER REFERENCES

Francis et al., J. Chem. Soc. (London) 107 of 1915, pp. 1651 and 1652.

Evens et al., J. Chem. Soc. (London) 107 of 1915, pp. 1673–77.

Jones et al., J. Chem. Soc. (London) of 1933, pp. 363–368.